(12) United States Patent
Schwartz

(10) Patent No.: US 8,019,661 B2
(45) Date of Patent: *Sep. 13, 2011

(54) VIRTUAL WEB STORE WITH PRODUCT IMAGES

(75) Inventor: Robyn R. Schwartz, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 188 days.

This patent is subject to a terminal disclaimer.

(21) Appl. No.: 12/372,288

(22) Filed: Feb. 17, 2009

(65) Prior Publication Data

US 2009/0150245 A1  Jun. 11, 2009

Related U.S. Application Data

(63) Continuation-in-part of application No. 11/944,744, filed on Nov. 26, 2007.

(51) Int. Cl.
G06Q 30/00 (2006.01)

(52) U.S. Cl. ...................... 705/27.1; 705/26.1

(58) Field of Classification Search .............. 705/26, 705/27
See application file for complete search history.

(56) References Cited

U.S. PATENT DOCUMENTS

| | | |
|---|---|---|
| 4,929,819 A | 5/1990 | Collins, Jr. |
| 5,231,483 A | 7/1993 | Sieber et al. |
| 5,729,697 A | 3/1998 | Schkolnick et al. |
| 5,920,261 A | 7/1999 | Hughes et al. |
| 6,026,376 A | 2/2000 | Kenney |
| 6,032,127 A | 2/2000 | Schkolnick et al. |
| 6,058,259 A * | 5/2000 | Murakami ................ 703/2 |
| 6,081,269 A | 6/2000 | Quarendon |
| 6,381,583 B1 * | 4/2002 | Kenney .................. 705/26 |
| 6,507,366 B1 | 1/2003 | Lee |
| 6,659,344 B2 | 12/2003 | Otto et al. |
| 6,931,294 B2 * | 8/2005 | Macy et al. ............... 700/98 |
| 6,970,812 B2 | 11/2005 | Kamachi et al. |
| 7,044,369 B2 | 5/2006 | Gantz |
| 7,080,778 B1 | 7/2006 | Kressin et al. |
| 7,168,618 B2 | 1/2007 | Schwartz |
| 7,193,633 B1 * | 3/2007 | Reinhardt et al. ........... 345/629 |
| 2002/0094134 A1 * | 7/2002 | Nafis et al. ................. 382/285 |
| 2002/0121547 A1 | 9/2002 | Wieth et al. |
| 2002/0161651 A1 | 10/2002 | Godsey et al. |
| 2004/0111454 A1 | 6/2004 | Sorensen |

(Continued)

FOREIGN PATENT DOCUMENTS

EP  0265334 B1  4/1988

(Continued)

OTHER PUBLICATIONS

"Are you ready for E-tailing?" by Paul Kemp and published by the Harvard Business Review in Oct. 2006.*

*Primary Examiner* — Jeffrey A Smith
*Assistant Examiner* — Courtney Stopp
(74) *Attorney, Agent, or Firm* — John R. Pivnichny

(57) ABSTRACT

A three dimensional web store having product images is created. Three dimensional product images are rendered from manufacturing information instead of the products themselves. The location of all products, advertisements, aisles, signs, and displays is determined for a real world store. The web store is then created using three dimensional internet or virtual world viewing and maneuvering capabilities, to appear identical to the real world store.

8 Claims, 5 Drawing Sheets

U.S. PATENT DOCUMENTS

| | | | |
|---|---|---|---|
| 2004/0257361 A1 * | 12/2004 | Tabakman et al. | 345/419 |
| 2005/0177463 A1 | 8/2005 | Crutchfield, Jr. et al. | |
| 2005/0253840 A1 * | 11/2005 | Kwon | 345/419 |
| 2005/0264421 A1 * | 12/2005 | Yun | 340/572.1 |
| 2006/0032914 A1 | 2/2006 | Brewster et al. | |
| 2006/0262117 A1 * | 11/2006 | Chiba | 345/440 |

FOREIGN PATENT DOCUMENTS

| | | |
|---|---|---|
| GB | 2247592 A | 3/1992 |
| JP | 2002049771 A2 | 2/2002 |
| JP | 2003187335 A2 | 7/2003 |
| JP | 2003263544 A2 | 9/2003 |
| WO | 9934276 A2 | 7/1999 |
| WO | 0155973 A1 | 8/2001 |
| WO | 0217235 A2 | 2/2002 |
| WO | 0217235 A3 | 2/2002 |
| WO | 2005041099 A1 | 5/2005 |
| WO | WO2005/041099 A1 * | 5/2005 |

* cited by examiner

VIRTUAL WEB STORE WITH PRODUCT IMAGES

The application is a continuation-in-part to an application by the same inventor and assigned to the same assignee, also titled, Virtual Web Store with Product Images." The parent application is Ser. No. 11/944,744, filed Nov. 26, 2007.

FIELD OF THE INVENTION

The invention relates to virtual web stores and particularly to a web store with three dimensional images of store aisles and products. More particularly, a web customer may maneuver through the store aisles viewing three dimensional images of products created from manufacturing information for the products or their containers.

BACKGROUND OF THE INVENTION

Online shopping has been an increasing trend for those that do not have the time, desire or ability to access a real world store. For this reason, retailers have focused their attention on making increasingly interactive online shopping experiences for their customers.

With emerging technologies, such as three-dimensional internet (3Di) and virtual worlds, becoming popular, retailers are turning to these technologies to sell their products. Creating these three-dimensional (3D) web stores can become extremely time-consuming as well as costly. There are two areas that take up most of the time in designing such a store. These are designing the layout of the 3D web store and designing the product images that will be placed inside of it.

When creating a web store, retailers often approach a service providing company with expertise in the area. This company then designs the layout of the web store, deciding where to put the shelves, signs, displays, etc. This creative design of the web store can take time and effort that neither party can afford. The company may also design the product images to be used within the web store. These product images increasingly need to look identical to the actual product as it will sit in the web store and where it will sit. Currently, companies are turning to commercial artists to create the product images. They draw the packaging and add any additional artwork or words that are featured on the actual product. This can take a very long time as this process needs to be done for each product that will be featured in the web store. For this reason, it is necessary to find a more efficient means for creating a 3D web store and 3D images of products that will be featured within it.

U.S. Pat. No. 6,026,376 describes a system that uses encoded digital signals to represent images in the online store as they would be seen by a shopper in a real world store.

World Intellectual Property Organization Publication (WO) 2005/041099 describes a system that shows each product in an online store as a digital image. This invention lines up the digital images of each product in the sequence that they occur in the store.

However, there exists a need in the art to overcome the limitations of creating a virtual store and product images as described hereinabove. It is believed that such a capability would constitute a significant advancement in the art.

OBJECTS AND SUMMARY OF THE INVENTION

It is therefore a principal object of the present invention to enhance the virtual store creation arts by providing a system, program product, and services business for a store creation with enhanced capabilities.

It is another object to provide such a system, program product, and services business which may be practiced in a relatively inexpensive manner and is particularly adapted for repetitive use.

It is a further object to provide an enhanced system, program product, and services business for rendering product and packaging images for use in a virtual store.

These and other objects are attained in accordance with one embodiment of the present invention wherein there is provided a system for creating a web store, comprising means for determining a location of each product, aisle, advertisement, sign and display within a real world store, means for collecting information about each advertisement, sign and display within the real world store, means for receiving manufacturing information for fabricating each product, means for rendering a respective three dimensional product image for each product from the manufacturing information, and means for creating a web store using three dimensional internet or virtual world maneuverability, with images of each aisle, advertisement, sign, and display positioned at the determined location, and with each respective product image positioned at a respective determined location within the real store.

In accordance with another embodiment of the invention there is provided a system for creating three dimensional images of a product and product packaging, comprising means for receiving manufacturing information for fabricating the product and the product packaging, and means for rendering the three dimensional images of the product and the product packaging from the manufacturing information without having the product or product packaging available.

BEST MODE FOR CARRYING OUT THE INVENTION

Figure 1:
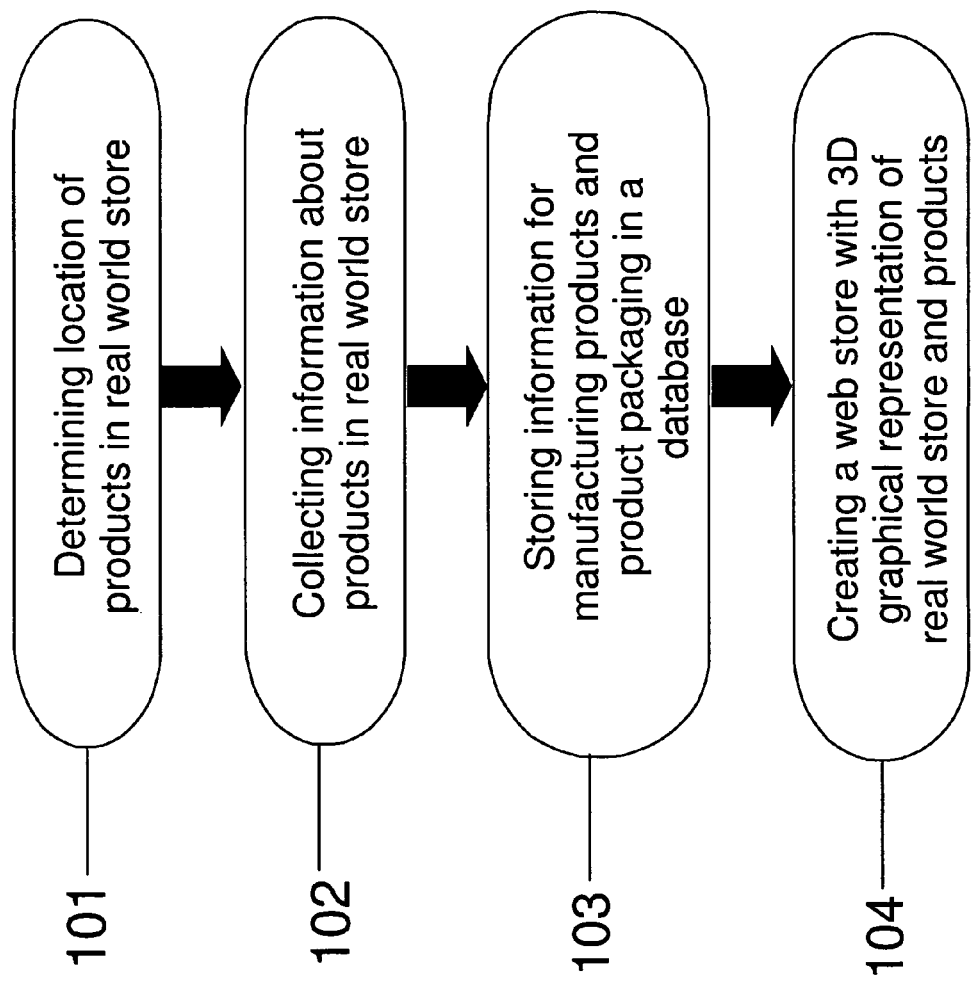
FIG. 1 depicts a flowchart describing the steps of creating a web store.

This present invention provides a system for creating a three-dimensional (3D) web store and the product images within it. In the drawings, the same reference numerals are used to indicate the same components.

FIG. 1 contains a flowchart with the steps for creating web store 40. Step 101 requires determining the location of product 20 within real world store 30. The location of any advertisement, sign 36 and display 32 is located as well. This can be accomplished with the use of radio frequency identification (RFID) tag technology, a video camera, or any other position determining technology known in the art. The location of the products 20, advertisements, signs 36 and displays 32 can either be determined to be in a specific location within real world store 30 or a general area, such as a department of the store. Information about each product 20 in real world store 30 is collected in step 102. Any information about the advertisements, signs 36 and displays 32 is collected as well. The information about each product 20 may include the quantity of the product 20 remaining, the sizes which are available in stock and any colors or any other product feature that is available in stock in the real world store 30 or by order from the product manufacturer. The information about the advertisements, signs 36 and displays 32 may include any artwork, words or symbols that are visible on each of these. Step 103 requires storing information used for manufacturing the real world products 20 and product packaging in database 53. The manufacturing information includes dimensions, graphics and any other information which may be needed to make the product 20 and its packaging. This information is then used by a program for creating three-dimensional graphical representations. The program must be given instructions on how to use each piece of information. The program then creates a three-dimensional graphical representation of the product 20 and its packaging using the manufacturing information. In step 104 web store 40 is created with a three-dimensional graphical representation of real world store 30 using the location and information collected about each product 20, advertisement, sign 36 and display 32. This representation can either be a representation of the store itself without the product images or it can include the product images 42 which were previously created. Web store 40 can then be accessed within a 3D internet (3Di), virtual world or both. Web store 40 is user interactive in that the user can move through web store 40 as one would through real world store 30. There may also be a third person view, where the user has an avatar 43 which moves through the store, or a first person view, where the user is looking around the store through his/her own eyes. The user can view the information that was previously collected either by looking at the 3D graphical representation or by clicking on the object. For example, clicking on an advertisement featured within web store 40 could take the user to the website of the advertiser. Those of ordinary skill in the art will recognize that the steps in FIG. 1 can be completed on a single system or on multiple systems which communicate with one another.

The system may be a general purpose computing system such as a personal computer, laptop, PDA, server, workstation, or combinations thereof. The system will include technology devices required to locate products in the real world store. If RFID technology is used, for example RFID tags on products, then at least one RFID reader will be included in the system. Similarly, at least one video camera will be included in the system if video camera technology is used to locate products.

The system also includes database software of any type known in the art. Rendering software for rendering three dimensional product images is included in the system.

Figure 2:
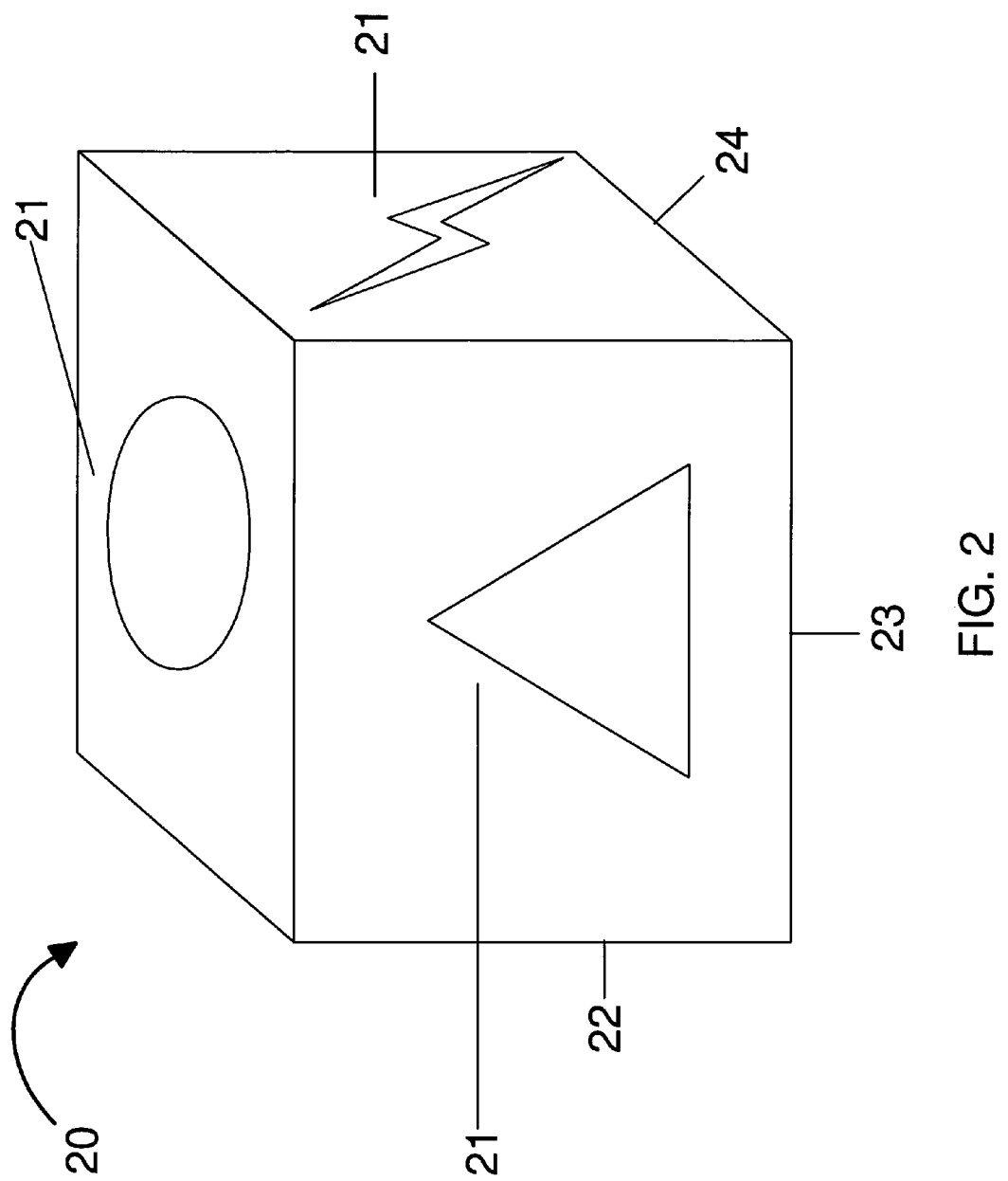
FIG. 2 illustrates product packaging to be rendered for a web store.

FIG. 2 shows real world product 20 and product packaging which has manufacturing information that may be stored in database 53. The details of surfaces 21 may be some of the manufacturing information stored in database 53. This includes any graphics, colors or words that may be visible. The dimensions of the real world product and product packaging including height 22, width 23, and length 24 may also be among the manufacturing information stored in database 53. This is not limiting, but rather any information that may be needed to create the real world product 20 and product packaging may be stored in database 53.

Figure 3:
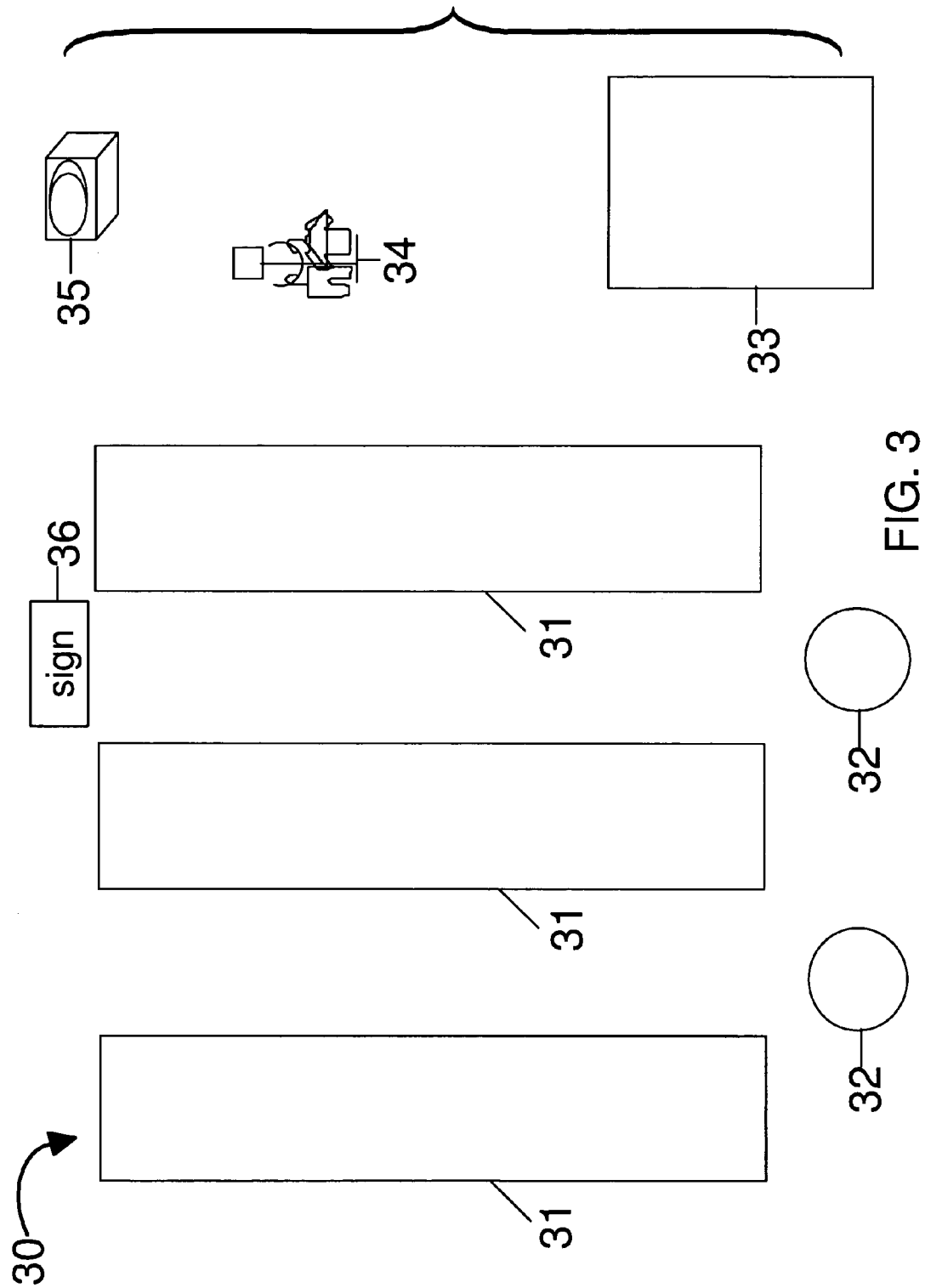
FIG. 3 is a layout of a real world store that can be illustrated in a web store.

FIG. 3 depicts real world store 30. The locations of aisles 31, displays 32, cashier counter 33, clothes rack 34 and sign 36 may all be captured. This can either be done by an image capturing device, such as video camera 35, or RFID tag technology, or any other location capturing technology. Video camera 35 can take continuous video or take video or still images at a predetermined interval thus allowing web store 40 to be continuously updated or updated at a predetermined interval to be modeled after the real world store. A plurality of real world stores may each be used to create a plurality of respective virtual stores. A virtual store user may then select which store to visit.

When determining inventory for the web store, real world store 30 may be used as a warehouse for shipping real product to customers of the web store; thus if a product 20 is out of stock in real world store 30, it will be listed as out of stock in web store 40. Alternatively, a separate warehouse could be used for shipping real product to customers of web store 40. In this situation, if one of the products 20 is out of stock in real world store 30, it does not necessarily have to be out of stock in web store 40. If a different warehouse is used for web store 40, there is also the option of offering additional products 20 as well as what is offered in real world store 30. In this situation a separate area is designated in web store 40 for products 20 which are available in web store 40 only.

Figure 4:
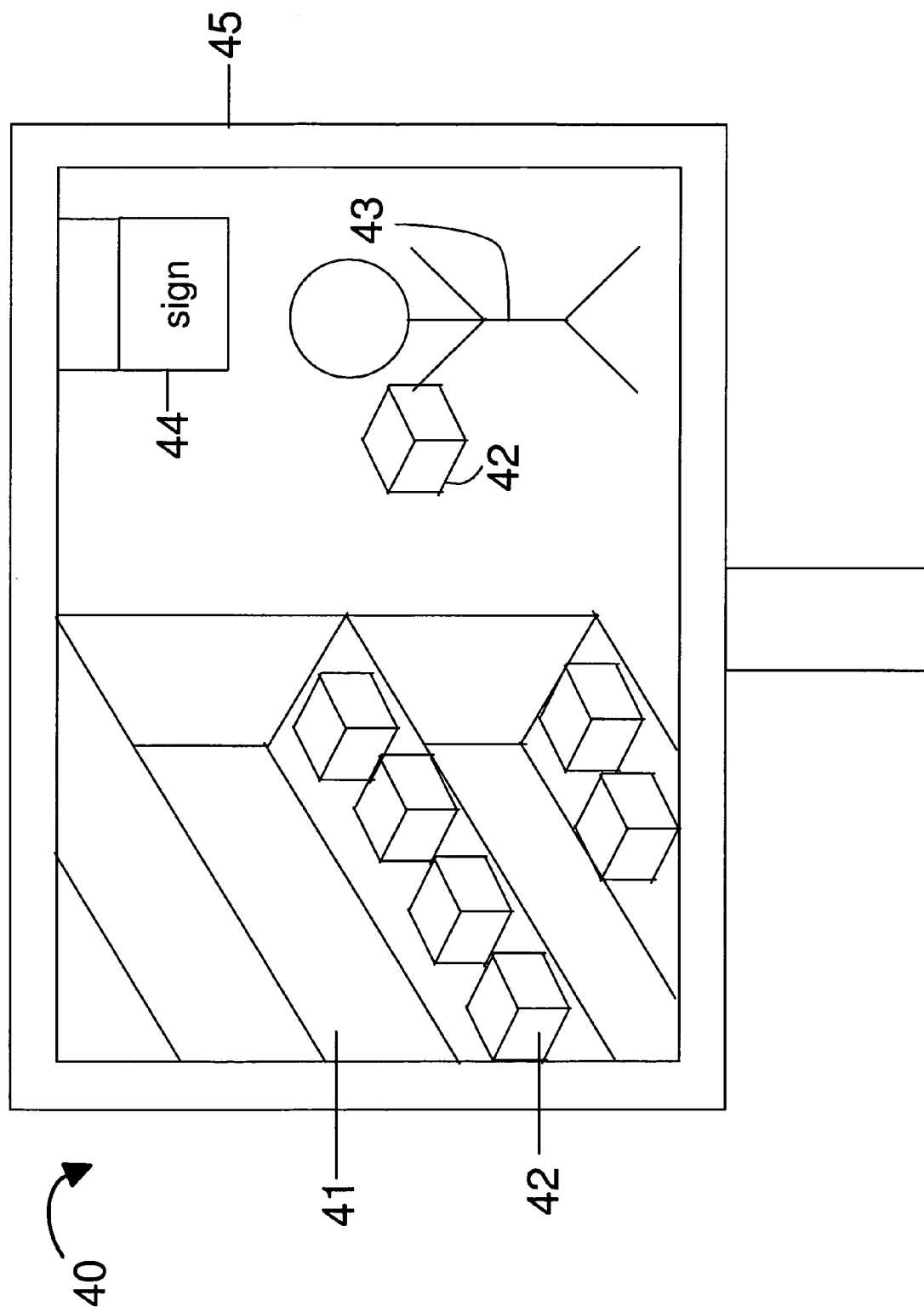
FIG. 4 depicts an illustration of a web store.

FIG. 4 illustrates web store 40 as it would be seen on display device 45. Display device 45 can be a computer display, mobile phone display or any other type of display device. Web store aisle 41 corresponds to real world aisle 31. The location of aisle 41 in web store 40 and product images 42 on aisle 41 would be identical to the location of aisle 31 in real world store 30 and the real world products 20 on aisle 31. Similarly, signs 44, advertisements and displays in web store 40 would also appear identical in location to advertisements, signs 36, and displays 32 in real world store 30. Product images 42 in web store 40 can be picked up by the user for example, through suitable keyboard or mouse commands, or by the user's avatar 43, and rotated to see all sides of product image 42 and its packaging. The user may appear to carry product image 42 or may have a virtual shopping cart where one can drag and drop product image 42.

Figure 5:
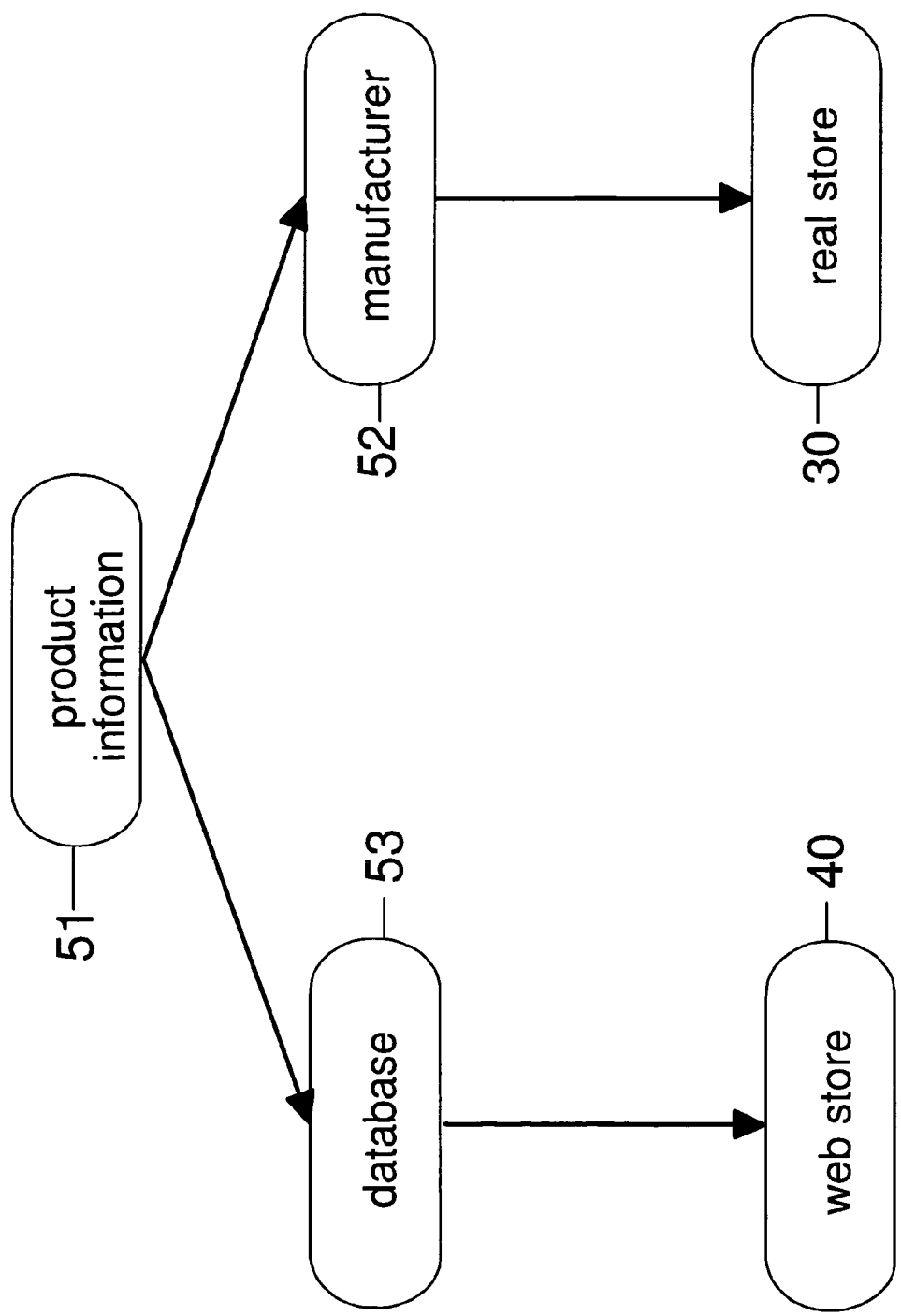
FIG. 5 is a flowchart showing how product manufacturing information is used for both product fabrication and product image creation.

FIG. 5 is a flowchart showing that product information 51 that is being sent to manufacturer 52 to fabricate the product 20 in real world store 30, is also to be sent to database 53 to create product image 42 in web store 40. For example, product image 42 may be created before real product 20 is fabricated by manufacturer 52 or before real product 20 is shipped to real store 30. In addition, as noted above it is in general much less expensive to create product image 42 from the product manufacturing information 51 than to create product images from the real product 20 or its packaging.

As noted above, a services providing company may be engaged to render the product and product packaging images from the manufacturing data for each product to be sold in the virtual store. The company then delivers the product and product packaging images to the client.

A services providing company may also be engaged to create the web store in accordance with the present invention, and deliver web store software to the client.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system of creating a web store, comprising:
   a general purpose computing system;
   an RFID reader attached to said computing system;
   a video camera attached to said computing system;
   RFID tags attached to products, aisles, advertisements, signs, and displays within a real world store for determining a location thereof, and for collecting information about said advertisements, said signs, and said displays;
   rendering software running on said general purpose computing system for rendering a respective three dimensional product image for each said product solely from manufacturing information for fabricating each said product, said manufacturing information having been created before real product is fabricated and without having said product physically available as a model; and web store software running on said general purpose computing system, having three dimensional internet or virtual world maneuverability, with images of each said aisle, said advertisement, said sign, and said display positioned at said determined location, and with each said respective product image positioned at a respective determined location within said real store.

2. The system of claim 1, wherein said location is continuously determined, said information is continuously collected, said manufacturing information is continuously received, said product image is continuously rendered, and said web store is continuously recreated to have images of each said aisle, advertisement, sign display and product positioned at a respective determined location within said real world store.

3. The system of claim 1, wherein said web store has an additional area for products not available in said real world store.

4. The system of claim 1, wherein said maneuverability includes capability for moving through said web store using a third person view.

5. The system of claim 4, wherein said third person view is an avatar.

6. The system of claim 1, wherein said location is determined at predetermined intervals, said information is collected at predetermined intervals, said manufacturing information is received at predetermined intervals, said product image is rendered at predetermined intervals, and said web store is recreated at predetermined intervals to have images of each said aisle, advertisement, sign display and product positioned at a respective determined location within said real world store.

7. A system for creating three dimensional images of a product and product packaging, comprising:
    a general purpose computing system having a database;
    manufacturing information stored in said database for fabricating said product and said product packaging, said manufacturing information having been created before real product is fabricated and without having said real product physically available as a model; and
    rendering software running on said general purpose computing system for creating said three dimensional images of said product and said product packaging solely from said manufacturing information without having said product or product packaging physically available.

8. The system of claim 7, further comprising a rendering software program for rendering said images by operating on said information in said database.

* * * * *